(12) United States Patent
Akiba et al.

(10) Patent No.: US 11,761,799 B2
(45) Date of Patent: Sep. 19, 2023

(54) SENSOR MODULE AND PROTECTIVE GLASS

(71) Applicant: AGC INC., Tokyo (JP)

(72) Inventors: Shusaku Akiba, Tokyo (JP); Masao Ozeki, Tokyo (JP); Satoshi Takeda, Tokyo (JP); Satoshi Kanasugi, Tokyo (JP); Satoshi Ogami, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 18/057,784

(22) Filed: Nov. 22, 2022

(65) Prior Publication Data

US 2023/0086147 A1 Mar. 23, 2023

Related U.S. Application Data

(63) Continuation of application No. 17/476,601, filed on Sep. 16, 2021, now Pat. No. 11,543,271, which is a continuation of application No. 16/727,070, filed on Dec. 26, 2019, now Pat. No. 11,204,266, which is a
(Continued)

(30) Foreign Application Priority Data

Jul. 5, 2017 (JP) ................. 2017-132137

(51) Int. Cl.
*G01D 11/26* (2006.01)
*B32B 17/10* (2006.01)
*G01D 11/24* (2006.01)

(52) U.S. Cl.
CPC ........ *G01D 11/26* (2013.01); *B32B 17/10137* (2013.01); *G01D 11/245* (2013.01)

(58) Field of Classification Search
None
See application file for complete search history.

(56) References Cited

U.S. PATENT DOCUMENTS

2006/0158066 A1 7/2006 Oda et al.
2007/0115102 A1 5/2007 Nakano et al.
2007/0144261 A1 6/2007 Okuda et al.
(Continued)

FOREIGN PATENT DOCUMENTS

CN 102791646 A * 11/2012 ........... C03C 21/002
CN 204415924 U 6/2015
(Continued)

OTHER PUBLICATIONS

International Search Report dated Sep. 25, 2018 in PCT/JP2018/025402 filed Jul. 4, 2018, citing documents AG-AJ and Ap-AX therein, 2 pages.
(Continued)

*Primary Examiner* — Jamel E Williams
(74) *Attorney, Agent, or Firm* — Oblon, McClelland, Maier & Neustadt, L.L.P.

(57) ABSTRACT

A sensor module includes: a base member; at least one of a single or a plurality of sensors and vibrators arranged on the base member; and a protective member constituted of at least one flat surface or a curved surface, provided so as to cover the at least one of the sensors and the vibrators. A part or whole of the protective member is formed of a strengthened glass and the strengthened glass is a chemically strengthened glass or a physically strengthened glass.

13 Claims, 4 Drawing Sheets

Figure 1:
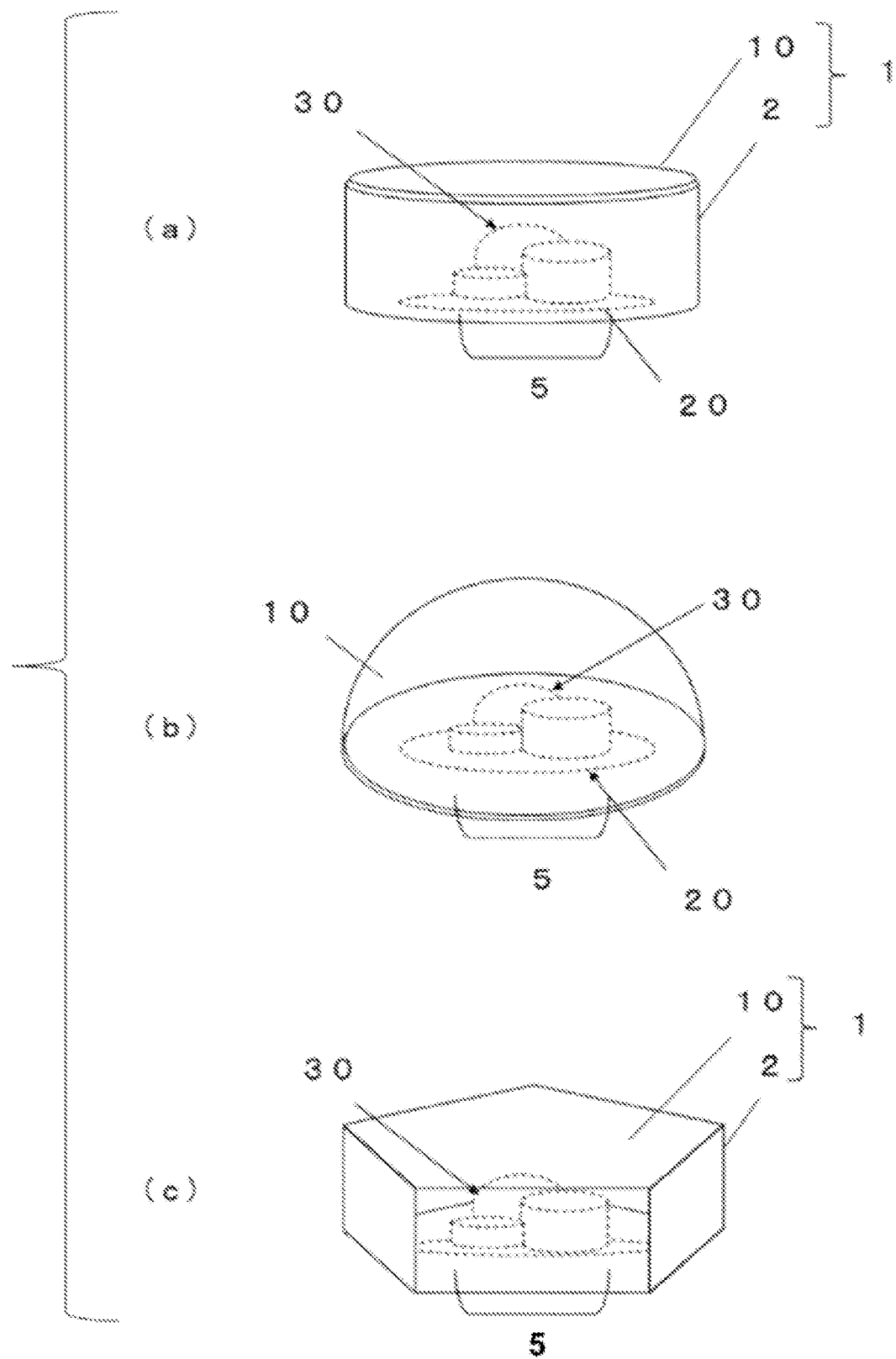

Related U.S. Application Data continuation of application No. PCT/JP2018/025402, filed on Jul. 4, 2018.

(56) References Cited

U.S. PATENT DOCUMENTS

| | | | |
|---|---|---|---|
| 2011/0181725 | A1 | 7/2011 | Matsuura et al. |
| 2012/0243093 | A1* | 9/2012 | Tonar .................... H10N 30/20 359/507 |
| 2013/0101798 | A1* | 4/2013 | Hashimoto ............ C03C 3/085 428/157 |
| 2013/0288001 | A1 | 10/2013 | Murata et al. |
| 2014/0227525 | A1 | 8/2014 | Matsuda et al. |
| 2014/0234607 | A1 | 8/2014 | Matsuda et al. |
| 2014/0248495 | A1 | 9/2014 | Matsuda et al. |
| 2016/0137166 | A1 | 5/2016 | Trevett et al. |
| 2016/0137167 | A1 | 5/2016 | Trevett et al. |
| 2016/0151811 | A1 | 6/2016 | Trevett et al. |
| 2016/0214889 | A1* | 7/2016 | Garner .................... C03C 3/076 |
| 2016/0326050 | A1 | 11/2016 | Lee et al. |
| 2017/0218236 | A1* | 8/2017 | Matsukawa ............ B32B 3/08 |
| 2017/0226007 | A1 | 8/2017 | Garner et al. |
| 2018/0095272 | A1 | 4/2018 | Fujimoto et al. |
| 2018/0250722 | A1 | 9/2018 | Trevett et al. |
| 2020/0202100 | A1* | 6/2020 | Nilsson .................... G01L 1/22 |

FOREIGN PATENT DOCUMENTS

| | | | |
|---|---|---|---|
| CN | 105683118 | | 6/2016 |
| JP | 2006-203563 A | | 8/2006 |
| JP | 2006-206283 A | | 8/2006 |
| JP | 2006206283 A | * | 8/2006 |
| JP | 2007-174323 A | | 7/2007 |
| JP | 2008-288720 A | | 11/2008 |
| JP | 2009-4866 A | | 1/2009 |
| JP | 2009-10906 A | | 1/2009 |
| JP | 2009-233625 A | | 10/2009 |
| JP | 2011-155468 A | | 8/2011 |
| JP | 2012-148909 A | | 8/2012 |
| JP | 2013-131110 A | | 7/2013 |
| JP | 2015-125022 A | | 7/2015 |
| JP | 2016-121051 A | | 7/2016 |
| JP | 2016-531792 A | | 10/2016 |
| JP | 2016-538233 A | | 12/2016 |
| WO | WO 2013/047679 A1 | | 4/2013 |
| WO | WO 2017/022382 A1 | | 2/2017 |
| WO | WO-2019009336 A1 * | 1/2019 | ....... B32B 17/10137 |

OTHER PUBLICATIONS

"Safety Glass Processing Technology Wood", China Nanbo Group Engineering Glass Division, pp. 25-26, Guangzhou: South China University of Technology Press. Mar. 31, 2010, pp. 25-26 (with unedited computer generated English translation).

"Glass curtain wall engineering technical specification application manual" Chen Jiandong Editor-in-Chief, pp. 172-173, Beijing: China Construction Dingye Press, Dec. 31, 1996, pp. 172-173 (with unedited computer generated English translation).

"What to Know about Machinery Manufacturing Inspectors", Editor, Quality and Safety Supervision Division, State Machinery Industry Commission, p. 149, Beijing: Machinery Industry Press, Sep. 30, 1990, p. 149 (with unedited computer generated English translation).

"Leather Analysis and Inspection", Edited by Leather Research Office of Northwest University of Light Industry—Beijing: China Light Industry Press, Dec. 1979, pp. 866-867, 5 total pages (with English translation).

\* cited by examiner

SENSOR MODULE AND PROTECTIVE GLASS

CROSS REFERENCE TO RELATED APPLICATIONS

This application is a continuation of U.S. application Ser. No. 17/476,601, filed on Sep. 16, 2021, which is a continuation of U.S. application Ser. No. 16/727,070, filed on Dec. 26, 2019, which is a continuation of international patent application PCT/JP2018/025402, filed on Jul. 4, 2018, the text of which is incorporated by reference, and claims foreign priority to Japanese Patent Application No. 2017-132137, filed on Jul. 5, 2017, the entire content of which is incorporated herein by reference.

TECHNICAL FIELD

The present invention relates to a sensor module accommodating therein at least one of a sensor and a vibrator, and a protective glass protecting a sensor or a vibrator.

BACKGROUND ART

A plurality of sensors having various functions are mounted on a car, an electric train, a mobile equipment such as drone, and a security device such as an outdoor sensor or a surveillance camera. A sensor module using a resin cover as a protective member protecting those sensors is known. When a sensor is arranged outdoors, it is required to select a material strong to weathering and heat shock, in addition to rigidity and scratch resistance of a protective member protecting a sensor.

The kind of the sensor arranged inside the protective member is an important factor for selecting a structure and material of the protective member. Uses of a sensor may be impaired depending on the structure and material of the protective member. For example, as a protective glass protecting the sensor, it is required to select a material having high transmitting property that transmits visible light.

A sensor using ultrasonic waves is known as a sensor that is mounted on a surveillance camera and a car (Patent Literature 1). The ultrasonic sensor described in Patent Literature 1 can receive ultrasonic waves that was sent from a transmitter element transmitting ultrasonic waves and reflected by an object to be detected, by a receiving member having a receiving part receiving ultrasonic wave.

Furthermore, ultrasonic waves are utilized in water repellency and cleaning of a window in addition to the measurement of a distance (Patent Literature 2). It can be expected that uses of the sensor using ultrasonic waves will be further expanded in future.

As a structure having a sensor arranged inside the protective member, a structure having a sensor arranged inside a protective member using a resin is known (Patent Literature 3). Patent Literature 3 discloses that electric continuity with electrodes of a vibrator arranged inside a casing is secured while using a resin casing as a protective member accommodating an ultrasonic sensor.

CITATION LIST

Patent Literature

Patent Literature 1: JP-A-2007-174323
Patent Literature 2: JP-T-2016-531792 (the term "JP-T" as used herein means a published Japanese translation of a PCT patent application)
Patent Literature 3: JP-A-2006-203563

SUMMARY OF INVENTION

Technical Problem

However, the protective member using a resin described in Patent Literature 3 had a problem that when the protective member was arranged outdoors, the protective member has low rigidity and does not have excellent scratch resistance and weather resistance.

The present invention has been completed in view of the above and has an object to provide a sensor module having higher rigidity as compared with the case of using a resin as a protective member and having excellent scratch resistance and weather resistance, by using a chemically strengthened glass as a protective member.

Solution to Problem

According to a certain aspect of the present invention, a sensor module including: a base member; at least one of a single or a plurality of sensors and vibrators arranged on the base member, and a protective member constituted of at least one flat surface or a curved surface, provided so as to cover the at least one of the sensors and the vibrators, wherein a part or whole of the protective member is formed of a strengthened glass and the strengthened glass is a chemically strengthened glass or a physically strengthened glass, is provided.

According to a certain aspect of the present invention, the sensor module, wherein the strengthened glass has a surface compressive stress value of 400 MPa or more and a depth of compressive stress layer of 10 μm or more, is provided.

According a certain aspect of the present invention, the sensor module, wherein the strengthened glass has the surface compressive stress value of 600 MPa or more and the depth of compressive stress layer of 40 μm or more, is provided.

According a certain aspect of the present invention, the sensor module, wherein the strengthened glass is a chemically strengthened glass and has a thickness of from 0.5 mm to 3.5 mm, is provided.

According a certain aspect of the present invention, the sensor module, wherein the strengthened glass is a chemically strengthened glass, has a thickness of from 1.5 mm to 3.5 mm, and has a depth of compressive stress layer in a range of from 200 μm to 580 μm, is provided.

According to a certain aspect of the present invention, the sensor module, wherein the chemically strengthened glass has a surface compressive stress value of 700 MPa or more, is provided.

According a certain aspect of the present invention, the sensor module, wherein the chemically strengthened glass has the depth of the compressive stress layer in a range of from 250 μm to 580 μm, and has a compressive stress value at a depth of 100 μm from a surface of 100 MPa or more, is provided.

According a certain aspect of the present invention, the sensor module, wherein the chemically strengthened glass has a curved surface shape having a convex surface and a concave surface, and a value obtained by subtracting a surface compressive stress value of the concave surface from a surface compressive stress value of the convex surface is 10 MPa or more, is provided.

According a certain aspect of the present invention, the sensor module, wherein a value obtained by subtracting a depth of compressive stress layer of the concave surface from a depth of compressive stress layer of the convex surface is 10 μm or more, is 10 μm or more is provided.

According a certain aspect of the present invention, the sensor module wherein the chemically strengthened glass has at least one bending point in a region forming the compressive stress layer and has a stress distribution curve having a different inclination with the bending point as a boundary, is provided.

According a certain aspect of the present invention, the sensor module, wherein the vibrator has an ultrasonic generating element, is provided.

According a certain aspect of the present invention, the sensor module, wherein the protective member has a transparent heater, is provided.

According a certain aspect of the present invention, the sensor module, wherein the strengthened glass has a first main surface and a second main surface facing the first main surface, and has an end surface between the first main surface and the second main surface, and the end surface has a surface roughness in a range of from 0.01 μm to 1.0 μm, is provided.

According a certain aspect of the present invention, the sensor module, wherein the strengthened glass is glass a ceramics, is provided.

According a certain aspect of the present invention, the sensor module, wherein the strengthened glass has a water-repellent film on the surface of the strengthened glass, is provided.

According a certain aspect of the present invention, a protective glass constituted of a flat surface or a curved surface, wherein a part or whole of the protective glass is a strengthened glass, and the strengthened glass is a chemically strengthened glass or a physically strengthened glass, is provided.

According a certain aspect of the present invention, the protective glass having an ultrasonic vibrator is provided.

According a certain aspect of the present invention, the protective glass having a transparent heater is provided.

Advantageous Effects of Invention

The sensor module of the present invention uses a strengthened glass as a protective member and therefore has high surface strength and edge strength, has high rigidity and scratch resistance and further has high weather resistance (weathering resistance and heat shock resistance). Therefore, the sensor module is suitable for arranging outdoors.

BRIEF DESCRIPTION OF DRAWINGS (a) to (c) of FIG. 1 are perspective views showing one example of the configuration of a sensor module in the embodiment of the present invention.

Figure 2:
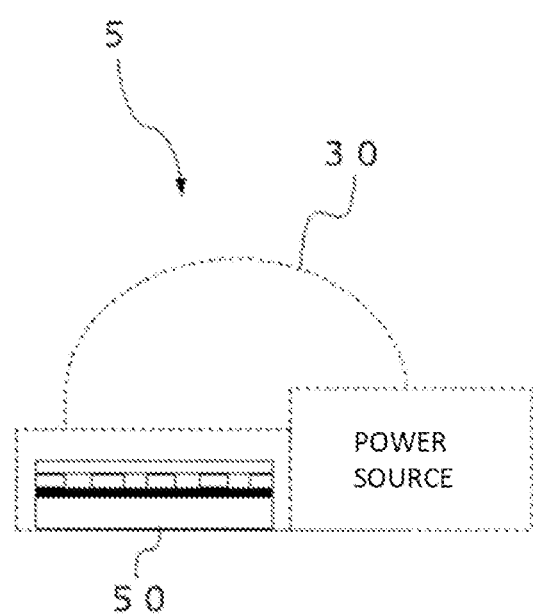

FIG. 2 is a side view showing one example of the configuration of a mounting part in this embodiment.

Figure 3:
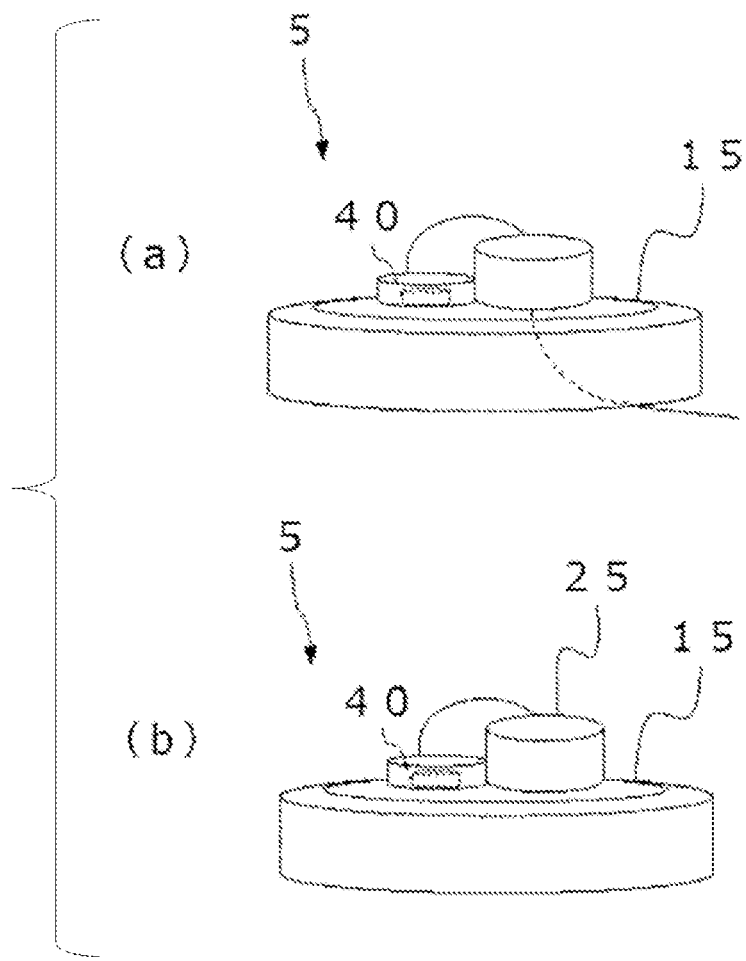

(a) and (b) of FIG. 3 are perspective views showing one example of a power supply mechanism of the mounting part in this embodiment. (a) of FIG. 3 shows a wired power supply and (b) of FIG. 3 shows a wireless power supply.

Figure 4:
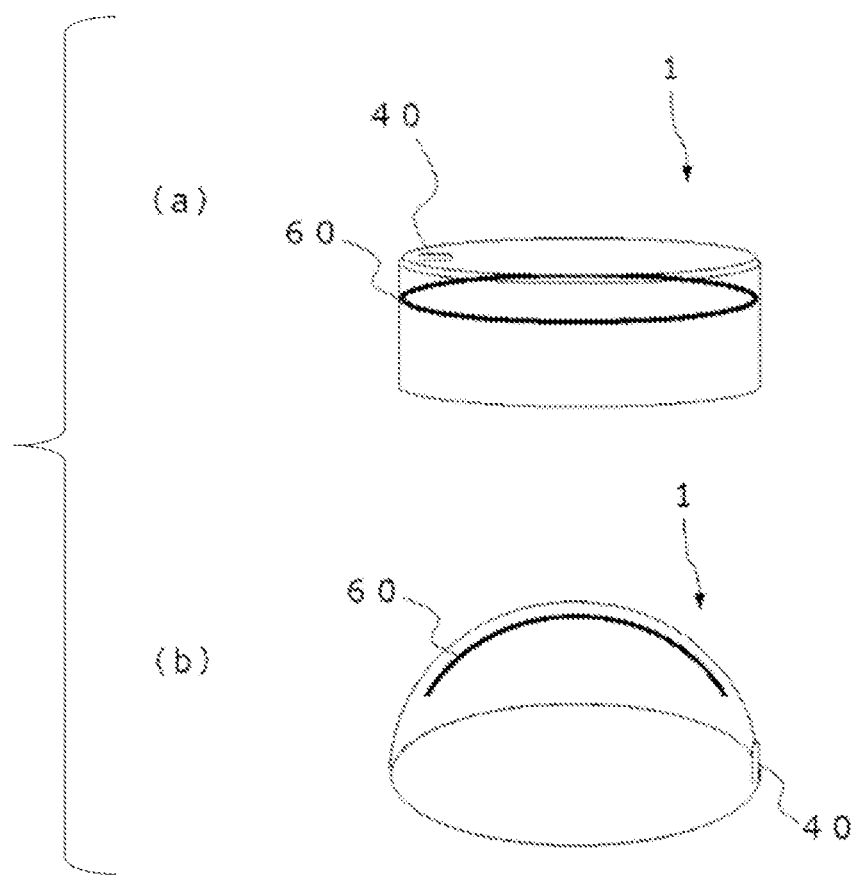

(a) and (b) of FIG. 4 are perspective views showing one example of the arrangement of a vibrator or a transparent heater in this embodiment.

DESCRIPTION OF EMBODIMENTS

Preferred embodiment of the present invention is described by reference to the drawings. In the description of reference signs in the drawings, the same or corresponding reference signs are allotted to the same or corresponding members or parts, and duplicate descriptions are omitted.

Furthermore, the expression "from . . . to" showing a numerical range in the present description is used in the meaning of including the numerical values indicated before and after "to" as the lower limit and the upper limit.

<Sensor Module>

The sensor module of this embodiment includes a base member 15, at least one of a single or a plurality of sensors 20 and vibrators 40 arranged on the base member 15, and a protective member 1 constituted of at least one of a flat surface and a curved surface, provided so as to cover the at least one of the sensor 20 and the vibrator 40. The elements constituting the sensor module of this embodiment are described in detail below.

<Protective Member 1>

(a) and (b) of FIG. 1 are perspective views showing one example of the configuration of a protective member 1 in this embodiment. (a) of FIG. 1 is a structure using a protective glass 10 as a lid part of a cylindrical casing (protective member 1) accommodating a sensor 20. (b) of FIG. 1 is a structure using a glass as a spherical surface of a hemisphere accommodating the sensor 20. A part or the whole of the protective member 1 is formed using the protective glass 10, but a support part 2 supporting the protective glass 10 may be formed in a part of the protective member 1 as shown in (a) of FIG. 1. The support part 2 may be a glass, but a metal such as stainless steel or alumite may be used. The protective member 1 is not limited to a cylindrical shape or a hemisphere, and may be a columnar shape, a prismatic shape and a three-dimensional shape such as a spherical regular polyhedron ((c) of FIG. 1). The protective member 1 can be formed by laminating a plurality of glasses. In the case of forming the support part 2, an adhesive layer is formed between the support part 2 and the protective glass 10, thereby sticking the support part 2 to the protective glass 10.

The protective member 1 accommodates the sensor 20 having detecting function or sensing function using millimeter wave, ultrasonic wave, visible light, infrared light or LIDAR or comprehensively using those. In the case where the sensor module of this embodiment is arranged outdoors, the protective member 1 as a casing is required to protect the mounting part 5 from climatic factors such as rain and snow and external factors such as shock by stepping stone. Therefore the protective member 1 requires certain strength against those factors.

The adhesive layer (not shown) sticking the protective glass 10 to the support part 2 preferably contains at least one selected from the group consisting of a polyvinyl acetate resin, a polyvinyl chloride resin, a polyvinyl alcohol resin, an ethylene copolymer resin, a polyacrylic acid ester resin, a cyanoacrylate resin, a saturated polyester resin, a polyamide resin, a linear polyimide resin, a melamine resin, a urea resin, a phenol resin, an epoxy resin, a polyurethane resin, an unsaturated polyester resin, a reactive acrylic resin, a rubber resin, a silicone resin, a modified silicone resin, a glass frit and a solder. By forming an adhesive layer made of a material that does not deform and does not weather even though arranged outdoors, using the resins and the like described above, durability of the protective member 1 can be enhanced.

When the protective member 1 has a transparent heater 60, the protective member can exhibit functions of anti-fogging and snow melting and can prevent that the sensor does not work by fogging and snow. Thus, this is preferred (see (a) of FIG. 4 and (b) of FIG. 4). The transparent heater is, for example, a transparent electrode of ITO or the like deposited at a sensor side of the protective member 1, and an electric current is applied to the transparent electrode, thereby generating heat. Water droplets and snow are evaporated by the heat, and water droplets and snow can be removed from the surface of the protective member 1. In order to exhibit the similar functions, a non-transparent metal may be used as a heater. In this case, the portion other than a window used for the sensor may be covered with the non-transparent metal, and the metal may be functioned as a heater.

<Protective Glass 10>

The protective glass 10 can be formed by subjecting a glass obtained through each step of cutting a large-sized plate glass into small size, followed by machining and polishing, and subjecting strengthening treatment such as chemical strengthening or physical strengthening. As the cutting method of the plate glass, for example, cutting by diamond blade, or a scribe cleaving method, a laser cutting method and the like can be applied. In case where strength of the protective glass 10 desired to be increased, a surface layer part of the protective glass 10 is preferably chemically strengthened or physically strengthened, and more preferably all of the surface layer part is chemically strengthened or physically strengthened. As a tool for applying machining or polishing to the protective glass, whetstone can be used. Other than this, a buff, a brush and the like formed of cloth, leather, rubber or the like can be used. In this case, an abrasive such as cerium oxide, alumina, carborundum or colloidal silica can be used. Above all, whetstone is preferably used as a polishing tool from the standpoint of dimensional stability.

In the protective glass 10, adhesiveness between the support part 2 and the mounting part 5 is improved by roughening the portion contacting the support part 2 or the mounting part 5 (for example, the portion corresponding to the end surface of the protective glass). The shape of the protective glass 10 is not particularly limited so long as the protective glass has a first main surface, a second main surface facing the first main surface and an end surface between the first main surface and the second main surface. For example, in the case where the protective glass 10 as a hemisphere shown in (b) of FIG. 1 is viewed from the side of a concave surface, when the portion (end surface) drawing a circle with a predetermined width is roughened, adhesiveness between the surface showing the circle and the facing portion to be bonded is improved, thereby facilitating the fixation. As a result, the protective glass 10 can be stably mounted. The level of roughening is specifically that a surface roughness Ra is 0.01 µm or more, preferably 0.05 µm or more, more preferably 0.1 µm or more and still more preferably 0.2 µm or more. When the end surface is excessively roughened, the adhesiveness between the end surface and the facing portion may be impaired. Therefore, surface roughness Ra of the end surface is 1.0 µm or less, preferably 0.5 µm or less and more preferably 0.4 µm or less. In the case where the support part 2 is constituted of a strengthened glass, the surface roughness Ra of the end surface of the support part 2 is preferably within the above range. The surface roughness Ra in the present description means arithmetic mean roughness defined in JIS B0601:2001.

The protective glass is not limited to the hemispherical protective glass 10 represented by (b) of FIG. 1. Other than a hemisphere, when a dome-shaped protective glass having a curved surface shape is used, in the case where the sensor 20 is a camera for visible light, the protective glass has the effect of expanding an imaging range (a field of view), which is preferred. In the case where the protective glass has a dome shape (curved surface shape), its size is not particularly limited. For example, an outer diameter is a range of from 10 to 30 mm and an inner diameter is a range of from 5 to 30 mm. When a dome-shaped glass plate including a hemisphere is processed to a dome shape and then subjected to a chemical strengthening treatment, large surface compressive stress is obtained at the side of a convex surface of the chemically strengthened glass plate as compared with the side of a concave surface thereof by shape effect. Furthermore, in the chemically strengthened glass plate, large depth of a compressive stress layer is obtained at the side of a convex surface as compared with the side of a concave surface thereof. For this reason, when the protective glass is particularly placed in outdoor environment, larger strengthening is obtained at the side of a convex surface corresponding to the side of a front surface, and this is preferred. The dome-shaped glass plate can realize desired surface compressive stress and depth of a compressive stress layer by appropriately adjusting the conditions of the chemical strengthening treatment.

In particular, in the case of chemically strengthening a dome-shaped glass plate, a value obtained by subtracting a surface compressive stress value of a concave surface from a surface compressive stress value of a convex surface is preferably 10 MPa or more, more preferably 15 MPa or more and still more preferably 20 MPa or more. Furthermore, a value obtained by subtracting DOL of a concave surface from DOL of a convex surface is preferably 10 µm or more, more preferably 20 µm or more and still more preferably 40 µm or more.

The dome-shaped protective glass 10 can be obtained by, for example, bending. Preferred embodiment of the bending is described below, but a method for obtaining a curved surface shape protective glass 10 in this embodiment is not limited to the embodiment described below.

In the bending, a glass is placed on a mold constituted of carbon, heated to a temperature region of from 600 to 950° C., hot-pressed for from 30 to 180 seconds while maintaining the temperature, and then gradually cooled. Thus, a curved surface shape glass plate is formed. The curved surface shape glass plate is cut into a desired external form, and the surface of the glass plate is polished. Thus, the curved surface shape protective glass 10 such as a dome-shaped protective glass 10 having a desired shape and a desired surface roughness is obtained.

The method for obtaining the curved surface shape protective glass 10 is not limited to bending, and is obtained by, for example, cutting of a thick glass plate.

The protective glass 10 may further have a water-repellent film (not shown) on the main surface thereof. Material of the water-repellent film is specifically a material having high water repellency, and is preferably a material further having an antifouling property. Examples of such materials of the water-repellent film include a fluorine-containing organic material and a fluorine resin, and more preferably include a fluorine-containing organic silicon compound and a fluorine-containing organic compound having hydrolyzability. Thickness of the water-repellent film is not particularly limited so long as transmitting property of the protective glass 10 is not impaired. For example, when the thickness is 10 nm or more, the effect of water repellency can be exhibited, and this is preferred. The thickness is more preferably 100 nm or more. The upper limit of the thickness of the water-repellent film is not particularly limited, but is preferably 1 μm or less from the standpoint of productivity.

The protective glass 10 is preferably constituted of a glass having high transparency. A multicomponent oxide glass can be used as a material of a glass used as the protective glass 10.

Specific examples of the composition of the glass used as the protective glass 10 are shown below, but the composition of the glass is not limited to those. The glass used in the present invention is not particularly limited so long as it contains sodium, and glasses having various compositions can be used so long as the glasses contain a composition that can be molded and strengthened by a chemical strengthening treatment or a physical strengthening treatment.

Specifically, examples of the glass include aluminosilicate glass, soda lime glass, borosilicate glass, lead glass, alkali barium glass, aluminoborosilicate glass, glass ceramics and alkali-containing optical glass. Of those, glass ceramics has relatively high strength. Therefore, when the glass ceramics is subjected to a physical strengthening treatment or a chemical strengthening treatment, a strengthened glass having higher strength is easily obtained.

Glass ceramics is that crystals are precipitated in a glass. As compared with an amorphous glass free of crystal, the glass ceramics is hard and difficult to be scratched. Furthermore, when the glass ceramics are subjected to an ion-exchange treatment to be chemically strengthened, strength can be further enhanced.

The glass ceramics can be obtained by heat-treating an amorphous glass under appropriate conditions. For example, glass ceramics having visible light haze value of 1.0% or less in terms of 0.8 mm thickness is useful as the protective glass 10. The haze value can be measured, for example, using illuminant C that is the standard of standard illuminant defined in CIE, using a haze meter "HZ-2" manufactured by Suga Test Instruments Co., Ltd.

One example of the composition of the glass used as the protective glass 10 contains, in mass percentage on oxide basis, $SiO_2$: from 56 to 66%, $Al_2O_3$: from 8 to 18%, $Na_2O$: from 9 to 17%, $K_2O$: from 1 to 11%, MgO: from 2 to 12%, CaO: from 0 to 5%, SrO: from 0 to 5%, BaO: from 0 to 5% and $ZrO_2$: from 0 to 5%.

One example of the composition of the glass used as the protective glass 10 contains, in mass percentage on oxide basis, $SiO_2$: from 58 to 65%, $Al_2O_3$: from 14 to 21%, $Na_2O$: from 12 to 19%, MgO: from 3 to 10%, $K_2O$: from 0.5 to 1.3%, $ZrO_2$: from 0.1 to 0.5% and $TiO_2$: from 0.0 to 0.1%.

One example of the composition of the glass used as the protective glass 10 contains, in mass percentage on oxide basis, $SiO_2$: from 55 to 65%, $Al_2O_3$: from 12 to 22%, $Na_2O$: from 10 to 20%, $K_2O$: from 0 to 2%, MgO: from 1 to 9% and $ZrO_2$: from 0 to 5%.

One example of the composition of the glass used as the protective glass 10 contains, in mass percentage on oxide basis, $SiO_2$: from 55 to 65%, $Al_2O_3$: from 12 to 22%, $Na_2O$: from 10 to 20%, $K_2O$: from 0 to 2%, MgO: from 1 to 9%, $ZrO_2$: from 0 to 1% and $TiO_2$: from 0 to 1%.

One example of the composition of the glass used as the protective glass 10 contains, in mass percentage on oxide basis, $SiO_2$: from 60 to 70%, $Al_2O_3$: from 9 to 19/o, $Na_2O$: from 9 to 19%, $K_2O$: from 0 to 4%, MgO: from 3 to 6%, CaO: from 0 to 1% and $ZrO_2$: from 0 to 1%.

One example of the composition of the glass used as the protective glass 10 contains, in mass percentage on oxide basis, $SiO_2$: from 45 to 70%, $B_2O_3$: from 1 to 9%, $Al_2O_3$: from 15 to 25%, $Na_2O$: from 7 to 18%, $K_2O$: from 0 to 1%, MgO: from 0 to 5%, CaO: from 0 to 1% and $TiO_2$: from 0 to 1%.

One example of the composition of the glass used as the protective glass 10 contains, in mass percentage on oxide basis, $SiO_2$: from 45 to 70%, $B_2O_3$: from 1 to 9%, $Al_2O_3$: from 15 to 25%, $Na_2O$: from 7 to 18%, $K_2O$: from 0 to 1%, MgO: from 0 to 5%, CaO: from 0 to 1% and $SnO_2$: from 0 to 1%.

One example of the composition of the glass used as the protective glass 10 contains, in mass percentage on oxide basis, $SiO_2$: from 50 to 80%, $Al_2O_3$: from 1 to 30%, $B_2O_3$: from 0 to 6%, $P_2O_5$: from 0 to 6%, $Li_2O$: from 0 to 20%, $Na_2O$: from 0 to 20%, $K_2O$; from 0 to 10%. MgO: from 0 to 20%, CaO: from 0 to 20%, SrO: from 0 to 20%, BaO; from 0 to 15%. ZnO: from 0 to 10%, $TiO_2$: from 0 to 5% and $ZrO_2$: from 0 to 8%.

One example of the composition of the glass used as the protective glass 10 contains, in mass percentage on oxide basis, $SiO_2$: from 65 to 75%, $Al_2O_3$: from 1 to 5%, $Na_2O$: from 7 to 17%, $K_2O$: from 0 to 1%, MgO: from 3 to 6% and CaO: from 6 to 9%.

One example of the composition of the glass used as the protective glass 10 contains, in mass percentage on oxide basis, $SiO_2$: from 65 to 75%, $Al_2O_3$: from 3 to 10%, $Na_2O$: from 7 to 17%, $K_2O$: from 0 to 1%, MgO: from 3 to 6%, CaO: from 6 to 9% and $ZrO_2$ as a trace component: from 0 to 1%.

Composition range of each component in the glass composition of the protective glass 10 of this embodiment having the above-described components and other optional components are described below. The unit of content in each composition is mass percentage or mass ppm, on oxide basis and is simply represented by "%" and "ppm", respectively.

$SiO_2$ is a main component of the glass. The $SiO_2$ content is preferably 45% or more, more preferably 55% and still more preferably 60% or more in order to maintain weather resistance of the glass and prevent devitrification.

On the other hand, the $SiO_2$ content is preferably 80% or less and more preferably 70% or less in order to facilitate melting and enhance foam quality.

$Al_2O_3$ is an essential component for improving weather resistance of the glass. In the glass of this embodiment, the $Al_2O_3$ content is preferably 7% or more and more preferably 10% or more in order to maintain practically necessary weather resistance.

The $Al_2O_3$ content is preferably 30% or less, more preferably 23% or less and still more preferably 20% or less in order to enhance optical properties and enhance foam quality.

$B_2O_3$ is a component accelerating melting of glass raw materials and enhancing mechanical properties and weather resistance. The $B_2O_3$ content is preferably 6% or less and more preferably 3% or less in order to prevent the occurrence of disadvantages such as formation of striae (ream) by volatilization and corrosion of a furnace wall.

Alkali metal oxides such as $Li_2O$, $Na_2O$ and $K_2O$ are components accelerating melting of glass raw materials and adjusting thermal expansion, viscosity and the like.

The $Na_2O$ content is preferably 8% or more and more preferably 10% or more.

The $K_2O$ content is preferably 3% or less and more preferably 1% or less.

$Li_2O$ is an optional component but facilitates vitrification and reduces an iron content contained as impurities derived from raw materials. Therefore, the protective glass 10 of this embodiment can contain $Li_2O$ in an amount of 2% or less.

The total content of those alkali metal oxides ($Li_2O+Na_2O+K_2O$) is preferably from 5 to 20% and more preferably from 8 to 15% in order to retain clarity when melting and maintain foam quality of the glass produced.

Alkaline earth metal oxides such as MgO, CaO, SrO and BaO are components effective to accelerate melting of glass raw materials and adjust thermal expansion, viscosity and the like.

MgO has a function of decreasing a viscosity when melting a glass and accelerating melting. MgO further has a function of decreasing a specific gravity and making it difficult to cause flaws on the protective glass 10. The MgO content is preferably 10% or less and more preferably 8% or less in order to decrease a coefficient of thermal expansion of the glass and prevent devitrification.

CaO is a component accelerating melting of glass raw materials and adjusting a viscosity, thermal expansion and the like. To achieve the above functions, the CaO content is preferably 0.5% or more and more preferably 1% or more. On the other hand, the CaO content is preferably 6% or less and more preferably 4% or less in order to prevent devitrification and obtain satisfactory transmitting property.

SrO has an effect increasing a coefficient of thermal expansion and decreasing high temperature viscosity of a glass. To achieve the effect, the protective glass 10 of this embodiment can contain SrO. The SrO content is preferably 3% or less and more preferably 1% or less in order to reduce a thermal expansion coefficient of a glass.

Similar to SrO, BaO has an effect increasing a thermal expansion coefficient and decreasing high temperature viscosity of a glass. To achieve the effect, the protective glass 10 of this embodiment can contain BaO. However, the BaO content is preferably 5% or less and more preferably 3% or less in order to suppress a thermal expansion coefficient of a glass low.

The total content of those alkaline earth metal oxides (MgO+CaO+SrO+BaO) is preferably from 1 to 15% and more preferably from 3 to 10% in order to reduce a coefficient of thermal expansion, prevent devitrification and maintain strength.

In the composition of the protective glass 10 of this embodiment, $ZrO_2$ may be contained as an optional component in an amount of preferably 10% or less and more preferably 5% or less in order to enhance heat resistance and surface hardness of a glass. When the $ZrO_2$ content is 10% or less, the glass is difficult to devitrify.

The protective glass 10 of this embodiment may contain $SO_3$ as a refining agent. In this case, the $SO_3$ content is, in mass percentage, preferably more than 0% and less than 0.5%. The $SO_3$ content is more preferably 0.4% or less, still more preferably 0.3% or less and still further preferably 0.25% or less.

The protective glass 10 of this embodiment may contain at least one of $Sb_2O_3$, $SnO_2$ and $As_2O_3$ as an oxidizing agent and a fining agent. In this case, each content of $Sb_2O_3$, $SnO_2$ and $As_2O_3$ is, in mass percentage, preferably from 0 to 0.5%. Each content is more preferably 0.2% or less and still more preferably 0.1% or less. Sill further preferably, those are not substantially contained.

The protective glass 10 of this embodiment may contain NiO. When NiO is contained, NiO further functions as a coloring component. Therefore, the NiO content is preferably 10 ppm or less based on the total amount of the glass composition.

The protective glass 10 of this embodiment may contain $Cr_2O_3$. When $Cr_2O_3$ is contained, $Cr_2O_3$ further functions as a coloring component. Therefore, the $Cr_2O_3$ content is preferably 10 ppm or less based on the total amount of the glass composition.

The protective glass 10 of this embodiment may contain $MnO_2$. When $MnO_2$ is contained, $MnO_2$ further functions as a visible light-absorbing component. Therefore, the $MnO_2$ content is preferably 50 ppm or less based on the total amount of the glass composition.

The protective glass 10 of this embodiment may contain $TiO_2$. When $TiO_2$ is contained, $TiO_2$ further functions as a visible light-absorbing component. Therefore, the $TiO_2$ content is preferably 1000 ppm or less based on the total amount of the glass composition.

The protective glass 10 of this embodiment may contain at least one component selected from the group consisting of CoO, $V_2O_5$ and CuO. When those components are contained, those components further function as a visible light-absorbing component, thereby decreasing visible light transmittance. Therefore, the content of those components is preferably 10 ppm or less based on the total amount of the glass composition.

<Chemical Strengthening Treatment>

The chemical strengthening treatment is conducted by immersing a glass containing sodium in a molten salt containing specific salt or base and having a temperature equal to or lower than a glass transition temperature, thereby ion-exchanging sodium ions with potassium ions having larger atomic radius. When a glass containing lithium is chemically strengthened, the chemical strengthening treatment conducted by ion-exchanging lithium ions with sodium ions having larger atomic radius. In the case of the glass containing both sodium and lithium, the chemical strengthening treatment may include two treatments of a treatment of ion-exchanging sodium ions with potassium ions and ion-exchanging lithium ions with sodium ions.

The chemical strengthening step is, for example, a step of bringing a glass containing sodium into contact with an inorganic salt containing at least one salt or base selected from the group consisting of potassium nitrate, sodium nitrate, $K_2CO_3$, $Na_2CO_3$, $KHCO_3$, $NaHCO_3$, $K_3PO_4$, $Na_3PO_4$, $K_2SO_4$, $Na_2SO_4$, KOH and NaOH to conduct ion-exchange between Na ions in the glass and K ions in the inorganic salt, thereby forming a compressive stress layer in the glass surface.

In the chemically strengthened glass obtained by the chemical strengthening treatment, a stress profile formed (a vertical axis is a compressive stress value (CS) and a horizontal axis is a depth of a compressive stress layer (DOL)) changes by controlling time and temperature of the ion exchange, a salt used and other treatment conditions. For example, in the case where a stress value of the chemically strengthened glass, obtained by conducting an ion exchange treatment of ion-exchanging lithium ions with sodium ions and an ion exchange treatment of ion-exchanging sodium ions with potassium ions to one glass, is measured, the stress profile draws a bent profile having different inclination with the bending point as a boundary. In other words, when the combination of ion-exchange to the glass is two or more groups and two or more kinds of ions in the glass are ion-exchanged, a depth of the compressive stress layer can be increased while increasing the surface compressive stress value, and a high strength chemically strengthened glass is obtained. Examples of the ion-exchange method include a method of immersing a glass in a molten salt containing two kinds of ions and a method of immersing a glass in multi-stage using different two or more kinds of molten salts. Thus, a stress profile in which the bending point is present as described above is obtained by passing through a process giving two or more groups of the combination of ion-exchanges.

When the surface of a glass is ion-exchanged and a surface layer having compressive stress remained therein is formed, compressive stress remains in the surface of a glass and strength of the glass is enhanced. The strengthened glass obtained changes depending on a thickness of a glass and its composition, and is appropriately designed so as to be surely strengthened depending on uses of the glass.

The chemical strengthening treatment is preferably conducted at a temperature in a range of from 300 to 500° C. from the standpoint of preventing change in quality (weathering) due to elution of an alkali in the chemically strengthened glass obtained by the chemical strengthening treatment. A salt such as hydrogen sulfate having the effect of preventing elution of an alkali may be added to a molten salt.

The thickness t of the chemically strengthened glass according to this embodiment contributes to reduction in weight, and therefore is generally 3.5 mm or less and preferably 2.5 mm or less. The thickness t is more preferably 2.0 mm or less, still more preferably 1.7 mm or less, still further preferably 1.5 mm or less, still further preferably 1.3 mm or less and particularly preferably 1.0 mm or less. The glass having the thickness t of less than 0.5 mm is easy to be broken. Therefore, the thickness t is preferably 0.5 mm or more.

The chemically strengthened glass according to this embodiment has a compressive stress layer in the surface thereof by the ion-exchange treatment. When a surface compressive stress value is high, the glass is difficult to be broken by curved mode. For this reason, the surface compressive stress value of the chemically strengthened glass is preferably 200 MPa or more, and more preferably 400 MPa or more, 600 MPa or more, 800 MPa or more, 900 MPa or more, 1000 MPa or more and 1100 MPa or more, in this order.

In the case where flaws having a depth exceeding the value of a depth of the compressive stress layer (DOL) are formed during the use of the chemically strengthened glass, breakage of the chemically strengthened glass is easy to occur. For this reason, the DOL of the chemically strengthened glass is preferably large. The DOL is preferably 10 μm or more, and more preferably 40 μm or more, 60 μm or more, 70 μm or more, 80 μm or more, 90 μm or more, 100 μm or more, 110 μm or more, 120 μm or more, 130 μm or more, 140 μm or more, 150 μm or more, 200 μm or more, 300 μm or more, 400 μm or more, 500 μm or more and 550 μm or more, in this order.

In particular, in the chemically strengthened glass used in the protective glass of this embodiment, when the combination of the thickness t and the DOL is a combination of thickness t being in a range of from 1.5 to 3.5 mm and the DOL being in a range of from 200 to 580 μm, the chemically strengthened glass is difficult to be broken even in outdoor environment, and this is preferred. The combination of the thickness t and the DOL is preferably a combination of the thickness t being in a range of from 1.8 to 3.5 mm and the DOL being in a range 250 to 580 μm and more preferably a combination of the thickness t being in a range of from 2.0 to 3.5 mm and the DOL being in a range of from 300 to 580 μm.

In the chemically strengthened glass used for the protective glass of this embodiment, in addition to the relationship between the thickness t and the DOL, the surface compressive stress value is preferably 700 MPa or more, more preferably 800 MPa or more and still more preferably 900 MPa or more.

In the chemically strengthened glass used for the protective glass of this embodiment, in addition to the relationship among the thickness t, the DOL and the surface compressive stress value, the compressive stress value at a depth of 100 μm from the surface is preferably 100 MPa or more and more preferably 105 MPa or more.

In the case where the strengthened glass is a physically strengthened glass, similar to the above, the surface compressive stress value and the depth of compressive stress are preferably the above ranges. In the case where the glass is physically strengthened, the temperature conditions are set such that the glass surface is cooled rapidly and the temperature inside the glass is gradually decreased, thereby obtaining a (physically) strengthened glass. In this case, the glass surface returns to room temperature in an elongated state and the inside of the glass gradually shrinks. As a result, a compressive stress layer is generated in the surface and tensile stress is generated in the inside of the glass. The characteristics of the physically strengthened glass are that the surface compressive stress is small but compressive stress is deeply present. For example, the surface compressive stress value is about 200 MPa and the depth of the compressive stress layer is 100 μm or more. Furthermore, for example, the surface compressive stress value may be from about 100 to 150 MPa and the depth of the compressive stress layer may be from ⅕ to ⅙ of the thickness of the glass.

The chemically strengthened glass preferably has at least one bending point in a region forming the compressive stress layer when a stress profile of vertical axis: CS and horizontal axis: DOL is given. When the chemically strengthened glass has a stress distribution curve having different inclination with the bending point as a boundary, the compressive stress layer enters deeply and the glass is difficult to be broken, which is preferred. As a result, the chemically strengthened glass exhibits the effect of preventing cracking of the protective glass by stepping stone and the like.

As for the strength of the chemically strengthened glass and physically strengthened glass obtained, evaluation index by stepping stone described before can be applied. Specifically, the strength can be evaluated based on SAE J400, JASO M104 and ISO 20567-1. For example, strength can be evaluated by confirming a cracked state when granite (gravel) having a size of from 9 to 15 mm as an emanation is ejected to a strengthened glass (including a dome shape) under 0.1 MPa, 0.2 MPa or 0.4 MPa based on the conditions of JASO M104.

Surface roughness (Ra) of the protective glass 10 can be appropriately set. For example, the surface roughness of the protective glass 10 is preferably 100 nm or less, more preferably 70 nm or less and still more preferably 50 nm or less.

The protective glass 10 may have a structure in which a vibrator 40 is arranged such that the protective glass itself vibrates (see (a) of FIG. 4 and (b) of FIG. 4). When the protective glass 10 is provided with the vibrator 40, the protective member 1 may be provided with or may not be provided with the sensor 20. The vibrator 40 may be directly mounted on the protective glass 10 or may be mounted on the support part 2. The protective glass 10 may have a vibration suppression function detecting vibration frequency and suppressing vibration. By this function, vibration damping of the protective glass 10 is prevented and given vibration frequency can be maintained. The vibrator 40 may be a piezoelectric element or may be an element oscillating with stable vibration frequency, such as an electromagnetic actuator, a piezo element, a crystal vibrator, a ceramic oscillator or a magnetostrictor. Thus, when the vibrator 40 vibrates, the protective glass functions as a speaker, and when mounted on a car, vibration during running can be suppressed. Furthermore, as described later, strains attached to the protective glass 10 can be removed.

<Sensor 20>

The sensor 20 accommodated has detecting function or sensing function using millimeter waves, ultrasonic waves, laser, visible light, infrared light or LIDAR or comprehensively using those and can be used as a non-contact sensor of a light detection method, an ultrasonic method, a microwave method, a laser method, a radiation method or an image discrimination method. For example, when the sensor 20 is mounted on a car, a distance to an adjacent vehicle approaching the car and an obstacle present in running direction can be measured using the detecting function. Furthermore, an external arrangement mechanism may be driven through a communication equipment arranged outside based on a signal transmitted by the sensor 20. For example, when the communication equipment is a transducer arranged on a windshield, a wiper can be driven and a heater can be operated, through the transducer.

The sensor 20 may be an ultrasonic sensor. Ultrasonic waves are utilized for the measurement of a distance and for water repellency and cleaning of a window, and always stable visibility and instrument display are obtained. In particular, when the sensor 20 is mounted on a car, the sensor can be applied to antifogging and snow melt by utilizing its characteristics.

When the sensor 20 is an ultrasonic sensor, it is known that ultrasonic waves are attenuated as frequency band of ultrasonic waves transmitted and received is high. For this reason, ultrasonic waves of frequency band lower than 100 KHz, such as from 1 KHz to 20 KHz or from 40 KHz to 60 KHz, are actually utilized.

<Camera 30>

One or a plurality of camera 30 is present depending on its uses. For example, when the camera 30 is mounted on means of transportation, such as a car or an electric train, or a mobile equipment such as a drone, a plurality of cameras may be arranged by use, such as for close range monitoring, forward monitoring and rear monitoring. Furthermore, an image and a video of approaching person and obstacle can be obtained by using the camera in combination with the detection function or the sensing function by the sensor 20.

<Mounting Part 5>

FIG. 2 is a side view showing one example of sensor configuration in this embodiment. The mounting part 5 is constituted of the sensor, the camera 30 and a connecting part connecting those. Power supply of the mounting part 5 may be wired power supply (see (a) of FIG. 3) and may be wireless power supply by external communication means using a sensor terminal (see (b) of FIG. 3). A plurality of sensors can be mounted by electrical conduction by the powder supply mechanism of the mounting part 5. In the connecting part connecting the sensor or camera 30, a lead wire and may be used in the base member 15, a conductive material may be used for forming the connecting part.

The mounting part is arranged on the base member 15. Material of the base member 15 may be silicon or glass, and other than those, may be a metal such as iron or aluminum. Alternatively, a conductive material may be laid between the base member 15 and the mounting part. For example, when an ultrasonic sensor is mounted, a vibrator has, for example, an ultrasonic generating element 50 and is fitted in the mounting part 5 such that the ultrasonic generating element 50 does not expose outside. In this case, a material such as aluminum, glass, polyimide, silicon or polycarbonate can be used for the vibrator.

<Driving Principle>

The ultrasonic generating element 50 as shown in FIG. 2 generally utilizes a principle of applying high frequency voltage to a piezoelectric element to vibrate the piezoelectric element. Ultrasonic waves generated by applying high frequency voltage to a piezoelectric element to vibrate the piezoelectric element is transmitted to a target object to be measured and received as reflected waves reflected by the object to be measured. As a result, for example, a distance to an approaching adjacent vehicle or an obstacle present in a running direction can be measured. The ultrasonic generating element 50 is provided with a transmitting part intermittently transmitting pulse signals and a receiving part receiving its reflected waves and therefore functions as a sensor.

The ultrasonic generating element 50 may utilizes a principle that a heating element is driven by applying an electric current that changes in an ultrasonic cycle to the heating element from a power supply and as a result, a calorific value by the heating element follows the frequency of an electric current and periodically changes. The periodical heat generated by the heating element is transmitted to the vibrator and the temperature of the vibrator periodically changes. The vibrator repeats thermal expansion and contraction periodically in a thickness direction depending on its temperature and vibrates. Ultrasonic waves are generated from a vibrating surface of the vibrator by the vibration. For the heating element, an electrical resistor generating Joule heat, such as aluminum may be used and Peltier element may be used.

The ultrasonic generating element 50 can detect reflected waves (from an obstacle or the like) using the receiving part equipped with a piezoelectric vibration detecting element. For example, the piezoelectric vibration detecting element can be prepared on SOI substrate by MEMS technology and is formed by laminating so as to sandwich a piezoelectric thin film between a top electrode and a bottom electrode. The piezoelectric thin film is, for example, lead zirconate titanate (PZT), and the piezoelectric vibration detecting element converts a displacement of the vibrating part adjacently arranged into an electrical signal and detects ultrasonic waves.

The piezoelectric vibration detecting element performs arithmetic processing based on an electric signal output into a circuit element to conduct amplification of a signal and removal of noises, and compares phase difference and time difference between ultrasonic waves transmitted from the transmitting part and ultrasonic waves detected. The vibrator is a piezoelectric element or may be an element stably oscillating vibration frequency, such as an electromagnetic actuator, a piezo element, a crystal vibrator, a ceramic oscillator or a magnetostrictor.

As the effect synergistically obtained, water droplets and stains attached to the protective glass can be removed by mounting the ultrasonic generating element 50 as a sensor and irradiating the protective glass with ultrasonic waves.

By the above, a sensor module equipped with a protective member, having both properties of various sensor functions such as detection of a distance and removal of stains and the chemically strengthened glass having high rigidity is provided.

EXAMPLES

The present invention is described below based on specific examples, but the invention is not construed as being limited to the following examples.

Examples 1 to 5 and Comparative Examples 1 to 4

Large-sized plate glasses A to E having a thickness of 0.5 mm consisting of aluminosilicate glass manufactured by a float process were prepared. Those aluminosilicate glasses had the following compositions in mass percentage on oxide basis.

Glass A: $SiO_2$: 60.9%, $Al_2O_3$: 12.8%, $Na_2O$: 12.2%, $K_2O$: 5.9%, MgO: 6.7%, CaO: 0.1%, SrO: 0.2%, BaO: 0.2% and $ZrO_2$: 0.1%

Glass B: $SiO_2$: 60.9%, $Al_2O_3$: 16.8%, $Na_2O$: 15.6%, MgO: 5.3%, $K_2O$: 1.2%, $ZrO_2$: 0.3% and $TiO_2$: 0.1%

Glass C: $SiO_2$: 71.6%, $Al_2O_3$: 1.9%, $Na_2O$: 13.4%, $K_2O$: 0.3%, MgO: 4.7%, CaO: 7.8% and $ZrO_2$: 0.2%

Glass D: $SiO_2$: 59.9%, $B_2O_3$: 7.7%, $Al_2O_3$: 17.2%, MgO: 3.3%, CaO: 4.1%, SrO; 7.7% and BaO: 0.1%

Glass E: $SiO_2$: 69.6%, $Al_2O_3$: 12.6%, $Li_2O$: 3.9%. $Na_2O$: 5.4%, $K_2O$: 1.6%, MgO: 4.7%, CaO: 0.2% and $ZrO_2$: 2.0%

Subsequently, protective members of Examples 1 to 5 and Comparative Examples 1 to 3 were produced from the glasses A to E through (1) plate glass cutting step, (2) machining step, (3) polishing step, (4-1) chemical strengthening step or (4-2) physical strengthening step and (5) laminating step shown below. Glass material used in each example is shown in Table 1. Glass plates having desired thickness were manufactured by adjusting tensile speed of a glass when producing a glass and conducting polishing and etching as necessary.

The protective member of Comparative Example 4 was produced using a resin in place of a glass.

(1) Plate Glass Cutting Step

The plate glass was cut into a given size using a diamond blade.

(2) Machining Step

Subsequently, the end surface of the glass cut was subjected to machining.

(3) Polishing Step

The glass subjected machining was mirror-polished. By this, a glass having surface roughness Ra of a main surface of 100 nm or less was formed.

(4-1) Chemical Strengthening Step

Examples 1 to 3

A molten salt of potassium nitrate ($KNO_3$) was heated to 430° C., and the glass subjected to the polishing step was immersed in the molten salt for 5 hours in Examples 1 and 3 and for 7 hours in Example 2 to perform a chemical strengthening treatment. After the chemical strengthening treatment, the glass was washed with ion-exchanged water at from 50 to 90° C. two times, washed with a running ion-exchanged water of room temperature and then dried at 60° C. for 2 hours.

Example 4

In Example 4, the chemical strengthening treatment was conducted in two stages. Specifically, the glass E subjected to the polishing step was immersed in a molten salt consisting of 100% $NaNO_3$ heated to 450° C., for 2.5 hours. After cleaning, the glass was immersed in a molten salt consisting of 100% $KNO_3$ heated to 425° C., for 1.5 hours, followed by cleaning. Thus, a chemically strengthened glass was obtained. Those cleanings were conducted in the same manner as in Examples 1 to 3.

(4-2) Physical Strengthening Step

Example 5

The glass C subjected to the polishing step was maintained in an electric furnace at a rapid cooling initiation temperature (the vicinity of a softening temperature) for 5 minutes, taken out of the electric furnace and allowed to cool in the atmosphere, thereby performing physical strengthening.

(5) Laminating Step

After the chemical strengthening treatment or physical strengthening treatment, the plate glass obtained was laminated to a cylindrical support part made of a glass with an adhesive layer. Thus, protective members of Examples 1 to 5 and Comparative Examples 1 to 4 were prepared.

Evaluation Step

Evaluation of the protective member (glass or resin) of each example was conducted by the following analytical method.

In the evaluation of transmittance of the protective member, transmission spectrum in a wavelength region of from 300 to 1000 nm was measured using a spectrophotometer (U-4100 manufactured by Hitachi High-Technologies Corporation). The minimum value Tmin in a wavelength region of from 400 to 800 nm was calculated.

Surface compressive stress value (CS) and depth of compressive stress layer (DOL) of the strengthened glass were measured using a glass surface stress meter FSM-6000 or SLP-1000 manufactured by Orihara Industrial Co., Ltd.

TABLE 1

| Example | Strengthening | Chemical strengthening conditions ||||| Glass material | Thickness (mm) | Surface compressive stress CS (MPa) | Depth of compressive stress layer DOL (μm) |
| | | (First stage) Chemical strengthening || (Second stage) Chemical strengthening || | | | |
| | | Molten salt | Temp/time | Molten salt | Temp/time | | | | |
|---|---|---|---|---|---|---|---|---|---|
| Ex. 1 | Chemical strengthening | KNO₃ 100 wt % | 430° C. 5 hours | — | — | Glass A | 1.0 | 700 | 45 |
| Ex. 2 | | KNO₃ 100 wt % | 430° C. 7 hours | — | — | Glass B | 1.0 | 1100 | 45 |
| Ex. 3 | | KNO₃ 100 wt % | 430° C. 5 hours | — | — | Glass C | 1.0 | 600 | 10 |
| Ex. 4 | | NaNO₃ 100 wt % | 450° C. 2.5 hours | KNO₃ 100 wt % | 425° C. 1.5 hours | Glass E | 1.0 | 800 | 150 |
| Ex. 5 | Physical strengthening | — | — | — | — | Glass C | 3.0 | 110 | 500 |
| Comparative Ex. 1 | Non-strengthening | — | — | — | — | Glass A | 1.0 | — | — |
| Comparative Ex. 2 | | — | — | — | — | Glass B | 1.0 | — | — |
| Comparative Ex. 3 | | — | — | — | — | Glass D | 1.0 | — | — |
| Comparative Ex. 4 | | — | — | — | — | Resin | 2.0 | — | — |

| Example | Rigidity evaluation (stepping stone test result) | Light transmittance | Light resistance | Removal of water droplets | Crack resistance | Heat resistance evaluation | Comprehensive evaluation |
|---|---|---|---|---|---|---|---|
| Ex. 1 | ○ | ○ | ○ | ○ | ○ | ○ | ○ |
| Ex. 2 | ○ | ○ | ○ | ○ | ○ | ○ | ○ |
| Ex. 3 | Δ | ○ | ○ | ○ | ○ | ○ | ○ |
| Ex. 4 | ○ | ○ | ○ | ○ | ○ | ○ | ○ |
| Ex. 5 | Δ | ○ | ○ | ○ | ○ | ○ | ○ |
| Comparative Ex. 1 | x | ○ | ○ | ○ | x | ○ | x |
| Comparative Ex. 2 | x | ○ | ○ | ○ | x | ○ | x |
| Comparative Ex. 3 | x | ○ | ○ | ○ | x | ○ | x |
| Comparative Ex. 4 | x | ○ | x | ○ | x | x | x |

Evaluation results evaluating rigidity, light transmitting property, weather resistance, removal of water droplets by ultrasonic irradiation, cracking of glass by ultrasonic irradiation and heat resistance to the protective member of each example are shown in Table 1. For example, rigidity evaluation of "○" shows that the protective member has sufficient rigidity necessary in the case of arranging outdoors a sensor module equipped with the protective member and "Δ" shows that the protective member does not satisfy necessary rigidity in a part of the results. "x" shows that necessary rigidity is not satisfied in all cases.

1. Rigidity Evaluation (Stepping Stone Test Result)

Rigidity evaluation (stepping stone test) was carried out to the protective member of each example. Deformation amount of a protective material when a certain force is applied is required to be small in order to protect a sensor and in order that the internal sensor maintains certain sensing function. The rigidity evaluation was conducted based on the conditions of JASO M104. Specifically, granite (gravel) having a size of from 9 to 15 mm as an emanation was ejected at an angle of 90° in an ejection distance of 350 mm three times. The test was conducted changing an ejection pressure, and the rigidity was evaluated as follows. The case where the protective member was broken by the ejection pressure of 0.1 MPa was evaluated as "x", the case where the protective member was not broken by the ejection pressure of 0.1 MPa but was broken by the ejection pressure of 0.2 MPa was evaluated as "Δ", the case where the he protective member was not broken by the ejection pressure of 0.2 MPa but was broken by the ejection pressure of 0.4 MPa was evaluated as "○", and the case where the protective member was not broken by the ejection pressure of 0.4 MPa was evaluated as "○○". The results are shown in Table 1.

2. Crack Evaluation

The protective material is required to be not broken when deformation is applied to the protective material. Ring-on-ring test was conducted to the protective member of each example using a jig having upper ring: 10 mm and lower ring: 30 mm by an autograph manufactured by Shimadzu Corporation. The protective member of each example was processed into a sample having a size of 50 mm×50 mm×1 mm. The case where the sample was broken when 600 MPa or more of tensile stress was applied was indicated as "○", and the case where the sample was broken when less than 600 MPa of tensile stress was applied was indicated as "x". The resin (Comparative Example 4) was not broken, but deformation amount was large and there was a concern of bringing into contact with an internal sensor when force was applied. For this reason, the resin was evaluated as "x". As a result, it was understood that the glasses subjected to the strengthening treatment of Examples 1 to 5 had rigidity and crack resistance necessary for protecting the sensor. On the other hand, it was understood that the glasses not subjected to the strengthening treatment (Comparative Examples 1 to 3) and the resin (Comparative Example 4) did not have sufficient rigidity and crack resistance.

3. Light Transmittance

Transmission spectrum in a wavelength region of from 400 to 800 nm of the protective member of each example was measured. In a sample having a size of 50 mm×50 mm×1 mm obtained by processing the protective member of each example, the sample having Tmin of 85% or more was evaluated as "○" and a sample having Tmin of less than 85% was evaluated as "x". As a result, it could be confirmed that regardless of the presence or absence of the strengthening treatment, each glass and the resin cover showed good results.

4. Weather Resistance

Resistance (weather resistance) to weathering and heat shock when a sensor module equipped with the protective member of each example was arranged outdoors was evaluated by the following tests.

The evaluation of weather resistance was conducted by both a test holding the protective member of each example at a temperature of 60° C. and a humidity of 80% for 100 hours and thereafter a test irradiating UV light having a wavelength of 300 nm or less for 10 hours. After conducting those tests, the protective member in which its surface was slightly cloudy white (weathering) in appearance was evaluated as "Δ", the protective member showing no change was evaluated as "○" and the protective member that was deformed and discolored was evaluated as "x". As a result, it could be confirmed that each glass excluding the resin cover (Comparative Example 4) showed good results.

5. Removal of Water Droplets

Ultrasonic vibrator was arranged in the protective member of each example and irradiated with ultrasonic waves, and whether water droplets attached to the protective member can be removed (evaluation: ○) or cannot be removed (evaluation: x) was evaluated. As a result, the effect of removing water droplets could be confirmed in all of the protective members, but cracking occurred in non-strengthened glasses (Comparative Examples 1 to 3). On the other hand, cracking did not occur in the strengthened glasses (Examples 1 to 5).

6. Heat Resistance Evaluation

Transparent heater was embedded in the protective member of each example, and after allowing to stand the protective heater at an elevated temperature for a certain time, its appearance was evaluated. Specifically, the protective member was held at 100° C. for 1 hour, and the presence or absence of remarkable deformation and discoloration was then visually observed. The protective member having deformation and discoloration is indicated as "x" and the protective member free of deformation and discoloration is indicated as "○". As a result, it was understood that the protective members using a glass of Examples 1 to 5 and Comparative Examples 1 to 3 showed good results.

Comprehensively judging from the evaluation results of the above 1 to 6, it was understood that the performance of the protective member strongly depended on a compressive stress value (CS) and a depth of a compressive stress layer (DOL) after the strengthening treatment due to the composition of a glass. Furthermore, it was understood based on the evaluation results obtained that CS and DOL of the protective glass were preferably DOL being 10 μm or more and CS being 100 MPa or more, and more preferably DOL being 40 μm or more and CS being 600 MPa or more.

Examples 6 to 10

Protective members of Examples 6 to 10 were produced using glass E through (1) plate glass cutting step, (2) machining step, (3) polishing step, (4-1) chemical strengthening step and (5) laminating step, and were evaluated by 1 to 6 above.

The chemical strengthening treatment in Examples 6, 7 and 10 was conducted in two stages. Specifically, the glass E after the polishing step was immersed in a molten salt consisting of 100% $NaNO_3$, washed, immersed in a molten salt consisting of 100% $KNO_3$, and washed. Thus, a chemically strengthened glass was obtained. The treatment temperature and time are show in Table 2.

The chemical strengthening treatment in Examples 8 and 9 was conducted in one stage. Specifically, the glass E after the polishing step was immersed in a molten salt consisting of 100% $NaNO_3$ and washed. Thus, a chemically strengthened glass was obtained. The treatment temperature and time are show in Table 2.

Examples 11 to 13

Protective members of Examples 11 to 13 were produced using the glass B through (1) plate glass cutting step, (2) machining step, (3) polishing step, (4-1) chemical strengthening step and (5) laminating step, and were evaluated by 1 to 6 above.

The chemical strengthening treatment was conducted in one stage. Specifically, the glass B after the polishing step was immersed in a molten salt consisting of $KNO_3$ and a specific weight ratio of $Na_2NO_3$ added thereto, and then washed. Thus, a chemically strengthened glass was obtained. The weight ratio between $KNO_3$ and $Na_2NO_3$ in the molten salt and the treatment temperature and time are shown in Table 2.

TABLE 2

| | Chemical strengthening conditions | | | | | | Compressive stress CS | | | Depth of compressive |
| --- | --- | --- | --- | --- | --- | --- | --- | --- | --- | --- |
| | (First stage) Chemical strengthening | | (Second stage) Chemical strengthening | | Glass | Thickness | Surface CS | Deep layer 100 μm CS | Deep Layer 200 μm CS | stress layer DOL |
| Example | Molten salt | Temp/time | Molten salt | Temp/time | material | (mm) | (MPa) | (MPa) | (MPa) | (μm) |
| Ex. 6 | $NaNO_3$: 100 wt % | 450° C. 2.5 hours | $KNO_3$: 100 wt % | 425° C. 1.5 hours | Glass E | 2.0 | 941 | 80 | 7 | 217 |
| Ex. 7 | $NaNO_3$: 100 wt % | 450° C. 15 hours | $KNO_3$: 100 wt % | 425° C. 1.5 hours | | 2.0 | 954 | 108 | 43 | 304 |
| Ex. 8 | $NaNO_3$: 100 wt % | 450° C. 24 hours | — | — | | 2.0 | 264 | 119 | 49 | 351 |

TABLE 2-continued

| Ex. 9 | NaNO$_3$: 100 wt % | 450° C. 48 hours | — | — | | 3.2 | 242 | 145 | 85 | 541 |
| Ex. 10 | NaNO$_3$: 100 wt % | 450° C. 48 hours | KNO$_3$: 100 wt % | 425° C. 1.5 hours | | 3.2 | 930 | 115 | 70 | 550 |
| Ex. 11 | KNO$_3$: 95 wt % NaNO$_3$: 5 wt % | 430° C. 96 hours | — | — | Glass B | 2.0 | 718 | 92 | — | 140 |
| Ex. 12 | KNO$_3$: 95 wt % NaNO$_3$: 5 wt % | 430° C. 24 hours | — | — | | 2.0 | 762 | — | — | 85 |
| Ex. 13 | KNO$_3$: 96 wt % NaNO$_3$: 4 wt % | 475° C. 3 hours | — | — | | 2.0 | 760 | — | — | 41 |

| Example | Rigidity evaluation (stepping stone test result) | Light transmittance | Weather resistance | Removal of water droplets | Crack resistance | Heat resistance evaluation | Comprehensive evaluation |
|---|---|---|---|---|---|---|---|
| Ex. 6 | ○ | ○ | ○ | ○ | ○ | ○ | ○ |
| Ex. 7 | ○○ | ○ | ○ | ○ | ○ | ○ | ○ |
| Ex. 8 | ○ | ○ | ○ | ○ | ○ | ○ | ○ |
| Ex. 9 | ○○ | ○ | ○ | ○ | ○ | ○ | ○ |
| Ex. 10 | ○○ | ○ | ○ | ○ | ○ | ○ | ○ |
| Ex. 11 | Δ | ○ | ○ | ○ | ○ | ○ | ○ |
| Ex. 12 | Δ | ○ | ○ | ○ | ○ | ○ | ○ |
| Ex. 13 | Δ | ○ | ○ | ○ | ○ | ○ | ○ |

From the results of Table 2, in the protective members (chemically strengthened glasses) obtained in Examples 6 to 13, cracking did not occur under at least an ejection pressure of 0.1 MPa based on JASO M104 in the rigidity evaluation (stepping stone test result). Furthermore, the desired evaluation result was obtained in each of light transmittance, light resistance, cracking evaluation and heat resistance evaluation.

Examples 14 to 16

Flat plate-shaped glass E having a thickness of 6 mm was subjected to machining to form a dome-shaped glass having an inner radius of 18 mm (inner diameter: 36 mm), an outer radius of 20 mm (outer diameter: 40 mm) and a thickness (wall thickness) of 2 mm. The surface of the glass plate after machining was polished. Surface roughness Ra of the convex surface and concave surface was 8 nm, and surface roughness Ra of the end surface was 0.15 μm. In this case, the dome-shaped glass plate was a partially hemispherical glass having a horizontal width of 25 mm and a height of 5.3 mm. Thereafter, the partially hemispherical glass was immersed in a molten salt consisting of 100% NaNO$_3$, washed, immersed in a molten salt consisting of 100% KNO$_3$ and then washed. Thus, the protective members (partially hemispherical chemically strengthened glasses) of Examples 14 and 15 were obtained. Protective member (partially hemispherical chemically strengthened glass) of Example 16 was obtained using the flat plate-shaped glass E having a thickness of 6 mm in the same manners as above, except for forming a dome-shaped glass having an inner radius of 16.8 mm (inner diameter: 33.6 mm), an outer radius of 20 mm (outer diameter: 40 mm) and a thickness (wall thickness) of 3.2 mm. The chemical strengthening treatment temperature and time are shown in Table 3. Rigidity of the protective members obtained of Examples 14 to 16 was evaluated.

TABLE 3

| | Chemical strengthening conditions | | | | | |
|---|---|---|---|---|---|---|
| | (First stage) Chemical strengthening | | (Second stage) Chemical strengthening | | Glass material | Thickness (mm) |
| Example | Molten salt | Temp/time | Molten salt | Temp/time | | |
| Ex. 14 | NaNO$_3$: 100 wt % | 450° C. 2.5 hours | KNO$_3$: 100 wt % | 425° C. 1.5 hours | Glass E | 2.0 |
| Ex. 15 | NaNO$_3$: 100 wt % | 450° C. 15 hours | KNO$_3$: 100 wt % | 425° C. 1.5 hours | | 2.0 |
| Ex. 16 | NaNO$_3$: 100 wt % | 450° C. 48 hours | KNO$_3$: 100 wt % | 425° C. 1.5 hours | | 3.2 |

| | Compressive stress CS | | | | | | |
|---|---|---|---|---|---|---|---|
| | Convex surface | | Concave surface | | | | |
| Example | Surface CS (MPa) | Depth of compressive stress layer DOL (μm) | Surface CS (MPa) | Depth of compressive stress layer DOL (μm) | Surface CS of convex surface − surface CS of concave surface (MPa) | DOL of convex surface − DOL of concave surface (μm) | Rigidity evaluation (stepping stone test result) |
| Ex. 14 | 946 | 227 | 936 | 207 | 10 | 20 | ○ |
| Ex. 15 | 964 | 324 | 944 | 284 | 20 | 40 | ○○ |
| Ex. 16 | 945 | 590 | 920 | 510 | 25 | 80 | ○○ |

From the results of Table 3, the partially hemispherical chemically strengthened glasses (protective members) obtained in Examples 14 to 16 were that cracking did not occur under at least an ejection pressure of 0.2 MPa based on JASO M104 in the rigidity evaluation (stepping stone test result), thus showing high rigidity.

According to this embodiment, a sensor module having excellent rigidity, scratch resistance and weather resistance and suitable for outdoor uses can be provided.

Although the preferred embodiment of the present invention is described in detail below, but the present invention is not construed as being limited to the above-described specific embodiments and various modifications or changes can be made in the range of the gist of the present invention described in the scope of the claims.

Although the present invention has been described in detail and by reference to the specific embodiments, it is apparent to one skilled in the art that various modifications or changes can be made without departing the spirit and scope of the present invention. This application is based on Japanese Patent Application No. 2017-132137 filed Jul. 5, 2017, the disclosure of which is incorporated herein by reference in its entity.

REFERENCE SIGNS LIST

1: Protective member
2: Support part
5: Mounting part
10: Protective glass
15: Base member
20: Sensor
25: Power source
30: Camera
40: Vibrator
50: Ultrasonic generating element
60: Transparent heater

The invention claimed is:

1. A sensor module comprising:
a base member;
at least one of a single or a plurality of sensors and vibrators arranged on the base member; and
a protective member constituted of at least one flat surface or a curved surface, provided so as to cover the at least one of the sensors and the vibrators,
wherein a part or whole of the protective member is formed of a strengthened glass,
the strengthened glass is a chemically strengthened glass, and has a thickness of 1.5 mm or more,
the chemically strengthened glass has a curved surface shape having a convex surface and a concave surface, and
a value obtained by subtracting a surface compressive stress value of the concave surface from a surface compressive stress value of the convex surface is 10 MPa or more.

2. The sensor module according to claim 1, wherein the strengthened glass has a surface compressive stress value of 400 MPa or more.

3. The sensor module according to claim 1, wherein the strengthened glass has a surface compressive stress value of 600 MPa or more.

4. The sensor module according to claim 1, wherein the strengthened glass has a surface compressive stress value of 700 MPa or more.

5. The sensor module according to claim 1, wherein the chemically strengthened glass has a depth of the compressive stress layer in a range of from 250 μm to 580 μm, and has a compressive stress value at a depth of 100 μm from a surface of 100 MPa or more.

6. The sensor module according to claim 1, wherein a value obtained by subtracting a depth of compressive stress layer of the concave surface from a depth of compressive stress layer of the convex surface is 10 μm or more.

7. The sensor module according to claim 1, wherein the vibrator has an ultrasonic generating element.

8. The sensor module according to claim 1, wherein the protective member has a transparent heater.

9. The sensor module according to claim 1, wherein the strengthened glass is a glass ceramics.

10. The sensor module according to claim 1, wherein the strengthened glass has a water-repellent film on the surface of the strengthened glass.

11. A protective glass constituted of a flat surface or a curved surface,
wherein a part or whole of the protective glass is a strengthened glass,
the strengthened glass is a chemically strengthened glass, and has a thickness of 1.5 mm or more,
the chemically strengthened glass has a curved surface shape having a convex surface and a concave surface, and
a value obtained by subtracting a surface compressive stress value of the concave surface from a surface compressive stress value of the convex surface is 10 MPa or more.

12. The protective glass according to claim 11, having an ultrasonic vibrator.

13. The protective glass according to claim 11, having a transparent heater.

* * * * *